United States Patent [19]

Kaye

[11] 4,272,195

[45] Jun. 9, 1981

[54] METHOD AND APPARATUS FOR DETERMINING THE WAVELENGTH OF LIGHT

[75] Inventor: Wilbur I. Kaye, Corona Del Mar, Calif.

[73] Assignee: Beckman Instruments, Inc., Fullerton, Calif.

[21] Appl. No.: 45,722

[22] Filed: Jun. 5, 1979

[51] Int. Cl.³ .............................................. G02F 1/13
[52] U.S. Cl. ................................ 356/368; 350/331 R; 350/347 E
[58] Field of Search ............................. 356/364, 368; 350/331 R, 347 E; 250/225

[56] References Cited

U.S. PATENT DOCUMENTS

| | | | |
|---|---|---|---|
| 3,694,053 | 9/1972 | Kahn | 350/347 E |
| 3,785,721 | 1/1974 | Harsch | 350/347 E |
| 4,044,546 | 8/1977 | Kolke | 350/347 E |
| 4,076,423 | 2/1978 | Bates | 356/364 |

OTHER PUBLICATIONS

Mada et al., "Electro-Optical Properties of Twisted Nematic Liquid Crystals: An Application to Voltage Controllable Color Formation", *Revue de Physique Appliquée*, vol. 10, May 1975, pp. 147–151.

*Primary Examiner*—R. A. Rosenberger
*Attorney, Agent, or Firm*—R. J. Steinmeyer; Robert R. Meads

[57] ABSTRACT

A method and apparatus for determining the wavelength of a light beam wherein the light beam is directed through a liquid crystal cell functioning as a variable retarder, wherein the voltage applied to the cell is ramped to vary the retardation of the cell between maximum and minimum values, wherein the light from the beam passing through the cell is detected, wherein the intensity of the detected light is monitored, which intensity alternately passes through maximum and minimum values as the retardation of the cell is varied between its maximum and minimum values, and wherein the number of times the intensity alternates between its maximum and minimum values is determined to provide an indication of the wavelength of the light beam.

10 Claims, 7 Drawing Figures

METHOD AND APPARATUS FOR DETERMINING THE WAVELENGTH OF LIGHT

BACKGROUND OF THE INVENTION

Field of the Invention

The present invention relates to a method and apparatus for determining the wavelengths of a light beam and, more particularly, to a simple, inexpensive and rapid technique for determining the wavelength of an approximately monochromatic light beam.

Description of the Prior Art

Monochromatic light beams are often encountered in analytical spectroscopy and elsewhere. When desiring information as to the wavelength of such a light beam, it is customary to channel the beam into a monochromator including a rotatable dispersing element which sweeps its dispersed spectrum passed a slit in an aperture plate, a detector being positioned behind the slit. The angle of the light beam leaving the dispersing element is indicative of the wavelength thereof so that the position of the rotatable dispersing element when a maximum signal is received by the detector is an indication of the wavelength. This process is relatively slow and the apparatus is elaborate, complex and expensive. While other methods exist for determining the wavelength of a light beam, they are equally slow, elaborate, complex and expensive.

SUMMARY OF THE INVENTION

According to the present invention, the wavelength information of a light beam is determined rapidly and with smaller, potentially less expensive apparatus than available heretofore. This is achieved by using a zero-twist liquid crystal cell functioning as a low-cost variable retarder. The retardation of a liquid crystal cell can be varied rapidly and with the expenditure of negligible power simply by changing the voltage applied thereto. This feature, as well as the variable retardation characteristics of a liquid crystal cell, permit a determination of the wavelength of an incoming light beam.

More particularly, if a liquid crystal cell is positioned between a pair of crossed or parallel polarizers with its optical axis at a 45° angle to the optical axes of the polarizers and an incoming light beam is passed through the polarizers and the cell and the voltage applied to the cell is ramped to vary the retardation of the cell between its maximum and minimum values, the intensity of the light passing through the cell will alternately pass through maximum and minimum values. The number of times the intensity alternates between the maximum and minimum values is a function of the birefringence of the cell, the thickness of the liquid crystal layer, and the wavelength of the light. Since the birefringence and the thickness of the liquid crystal layer are known, the wavelength of the light can be determined by determining the number of times the intensity alternates between its maximum and minimum values.

Briefly, apparatus for determining the wavelength of a light beam according to the present invention comprises: a liquid crystal cell including a liquid crystal material and a pair of electrodes, the cell functioning as a variable retarder as the voltage between the electrodes is varied; a pair of crossed or parallel polarizers, the cell being positioned between the polarizers with the optical axis of the cell at a 45° angle to the optical axes of the polarizers; means for directing the light beam through the polarizers and the cell; means for detecting the light from the beam passing through the cell; means for applying a varying voltage to the electrodes of the cell to vary the retardation thereof between maximum and minimum values; and means responsive to the detecting means for analyzing the intensity of the detected light.

OBJECTS, FEATURES AND ADVANTAGES

It is therefore the object of the present invention to provide a rapid and simple method and apparatus for determining the wavelength of a light beam. It is a feature of the present invention to achieve this object by utilizing a zero-twist liquid crystal cell as a variable retarder to change the intensity of the light beam which is passed through the cell, the manner in which the intensity varies being indicative of the wavelength of the light beam. One advantage to be derived is that the wavelength of a light beam can be determined rapidly. Another advantage to be derived is that the wavelength of a light beam can be determined with the expenditure of negligible power. A still further advantage to be derived is that the wavelength of a light beam can be determined with small, potentially inexpensive apparatus.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

DESCRIPTION OF THE PREFERRED EMBODIMENT

Figure 1:
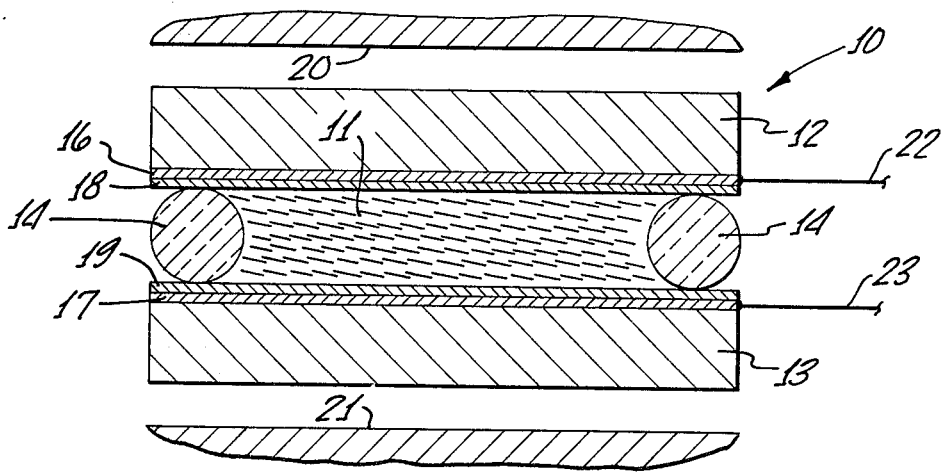
FIG. 1 is a schematic cross-sectional view of a liquid crystal cell for use in the present invention.

It is a teaching of the present invention to utilize a nematic-phase, zero-twist, liquid crystal cell as a variable retarder to determine the wavelength of a reasonably monochromatic light beam. However, before describing the application of a liquid crystal cell to such determination, it becomes necessary to understand the applicable properties of birefringent cells in general and liquid crystal cells in particular and the considerations involved in making a cell suitable for use in an optical instrument.

Birefringent cells in general have the property that their refractive index, hence the velocity of propagation of light therethrough, varies with direction through the cell. Such materials are said to be anisotropic. When a polarized light beam passes through a birefringent cell, the beam breaks into two orthogonally polarized components called the ordinary and extraordinary rays, which propagate with velocities which are inversely proportional to the two refractive indices existing in the directions of beam propagation. These two beams emerge from the birefringent cell with a difference in phase angles. The resultant beam, in general, is said to be elliptically polarized.

When the elliptically-polarized light beam passes through a polarizer, only those components of the beam with their electric vectors in the plane of polarization of the polarizer pass therethrough. The two component beams then interfere and the intensity of the resultant beam is a function of the relative phase angles of the component beams. The greater the product of birefringence and optical path through the birefringent material, the greater the phase angle shift.

If the slow ray emerges with its phase angle 90° behind the fast ray, the two beams totally interfere and the intensity of the beam falls to zero. If the slow ray emerges with its phase angle 180° or some multiple of 180° behind the fast ray, the two rays interfere constructively and there is no diminution of beam intensity.

Assuming that the optic axis of a birefringent cell has been oriented 45° from the parallel planes of polarization of polarizers on opposite sides thereof, the phase angle difference between the component beams is a function of the difference in refractive indices in the orthogonally propagating beam directions, the birefringence, $\Delta n$, the thickness, d, of the birefringent material, and the wavelength, $\lambda$, of light. Thus, the relative phase angle is:

$$\alpha = 2\pi d \Delta n / \lambda. \quad (1)$$

The intensity of the light passing through the second polarizer, neglecting any absorption losses, is given by the equation:

$$I = 1 - \sin^2 (\pi \Delta n d / \lambda). \quad (2)$$

The product $\Delta n d$ is called the retardation. When the retardation equals $M\lambda$, where M is an integer, the intensity equals unity and the retardation is of the order M. When the retardation equals $N\lambda/2$, where N is an odd integer, the ordinary and extraordinary rays destructively interfere, the intensity falls to zero, and the retardation is said to be of the half order.

A liquid crystal cell is an example of a birefringent element, but it also has a variable birefringence. A cross-section of a liquid crystal cell is shown in FIG. 1. Specifically, FIG. 1 shows a liquid crystal cell 10 consisting of a thin layer of liquid crystal material 11 sandwiched between first and second transparent plates 12 and 13, which are preferably made from glass. The spacing between plates 12 and 13 and, therefore, the thickness d of the liquid crystal layer is determined by suitable spacers 14. The inside surfaces of plates 12 and 13 are coated with transparent conducting layers 16 and 17, respectively, and transparent alignment layers 18 and 19, respectively. Conducting layers 16 and 17 are connected to electrical leads 22 and 23, respectively.

For use in the present invention, liquid crystal material 11 is of the nematic-phase type with a positive dielectric anisotropy. A variety of suitable materials are known to those skilled in the art. A mixture of trans cyano, alkyl biphenyl homologues is one of the most widely used materials for liquid crystal displays. Another available material is a pure trans cyano, propyl phenyl cyclohexane. Another available material is a eutectic mixture of propyl, pentyl, and heptyl cyano phenyl cyclohexane in the mole ratio 2.1 to 1.6 to 1.

For use in the present invention, plates 12 and 13 should have high transmittance, low strain and maximum flatness. The sides of plates 12 and 13 are typically polished to ¼ fringe. Conductors 16 and 17 are typically tin-doped $In_2O_3$ layers. The technique for the deposition of such a layer onto plates 12 and 13 is well known to those skilled in the art.

In a liquid crystal cell, it is necessary to align the liquid crystal molecules such that the long axes of the molecules are parallel to each other and approximately parallel to the surfaces of plates 12 and 13. This can be achieved by rubbing the inside surfaces of plates 12 and 13, as is known in the art. Alternately, alignment layers 18 and 19 on the inside surfaces of plates 12 and 13, respectively, may be used. In this later case, the liquid crystal molecules are typically aligned with layers of SiO deposited on the surfaces of plates 12 and 13.

When using a liquid crystal cell as a variable retarder in an optical instrument, such cell is sandwiched between a pair of polarizers 20 and 21. In such case, the optical axes of polarizers 20 and 21 are parallel or crossed and oriented at a 45° angle to the optical axis of cell 10.

In the absence of a field applied between conductors 16 and 17, the liquid crystal molecules assume an orientation dictated by alignment layers 18 and 19. That is, the angle between the director, or optic axis, and the plane of conductors 16 and 17 in the absence of a field is called the surface director tilt and is a function of alignment layers 18 and 19. The two alignment layers most commonly encountered in liquid crystal displays are the so-called H and L coats formed by depositing SiO on plates 12 and 13 at incidence angles of approximately 60° and 83°, respectively. It has been ascertained that the surface director tilt with an H coat is 0° and with an L coat is 25°. Other alignment layers known to those skilled in the art produce intermediate surface director tilts.

When a field is applied to cell 10, by applying a voltage between conducting layers 16 and 17, the field exerts a torque on the liquid crystal molecules therebetween and this torque is a function of the field strength, the dielectric anisotropy of the liquid crystal molecules, and the tilt of the liquid crystal molecules. Since the wall forces are stronger than the field forces, those molecules adjacent to plates 12 and 13 are relatively uninfluenced by the field. The elastic forces of the liquid crystal structure then distribute tilt within the cell and those molecules at the center of the cell are usually tilted most.

For a fuller discussion of liquid crystal cells and their application to optical instruments, reference should be had to my copending patent application Ser. No. 045,725 filed concurrently herewith and entitled Liquid Crystal Tuned Birefringent Filter.

Figure 2A:
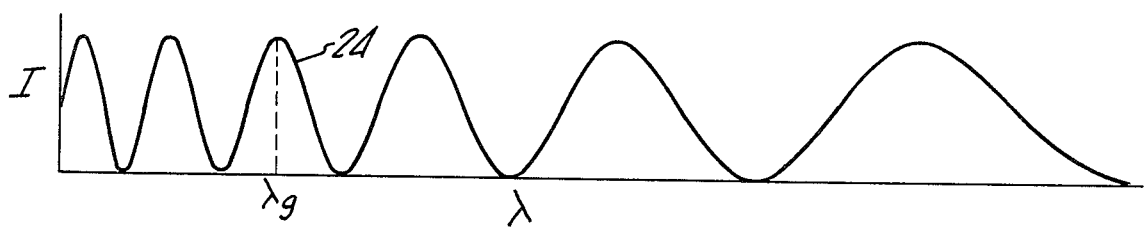
FIGS. 2(a)–2(c) are a series of waveforms showing the manner in which the retardation spectrum of a liquid crystal cell varies as the voltage applied thereto is varied.
Figure 2B:
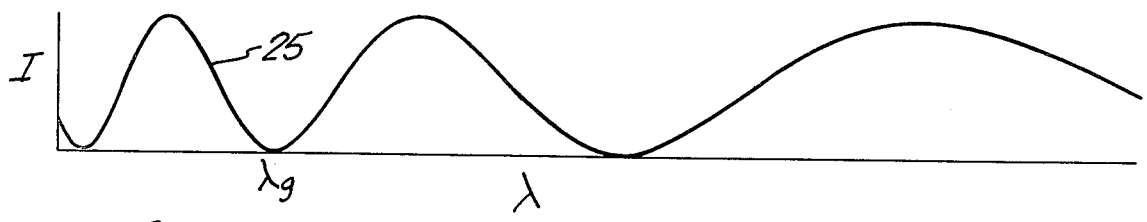
Figure 2C:

As a voltage is applied to cell 10, via leads 22 and 23 and electrodes 16 and 17, the liquid crystal molecules are rotated, changing the birefringence $\Delta n$ and varying retardation. The effect of applying a voltage to cell 10 can be better understood with reference to FIGS. 2(a)–2(c) which are plots 24–26, respectively, of the intensity I of light passing through a cell, such as cell 10, with polarizers on opposite sides thereof, as a function of wavelength $\lambda$, as the voltage varies. FIG. 2(a) shows the intensity of light passing through cell 10, of a given thickness, with no applied voltage. As the voltage is increased, the effect is to decrease the retardation so that the intensity of light passing through cell 10 as a function of wavelength now appears as in FIG. 2(b). As the voltage is increased even further, the intensity of light passing through cell 10 as a function of wavelength appears as in FIG. 2(c). It can therefore be seen that given a light beam of a given wavelength $\lambda_g$ passing through cell 10, the intensity of the light oscillates between maximum and minimum values as the voltage changes.

Figure 3:
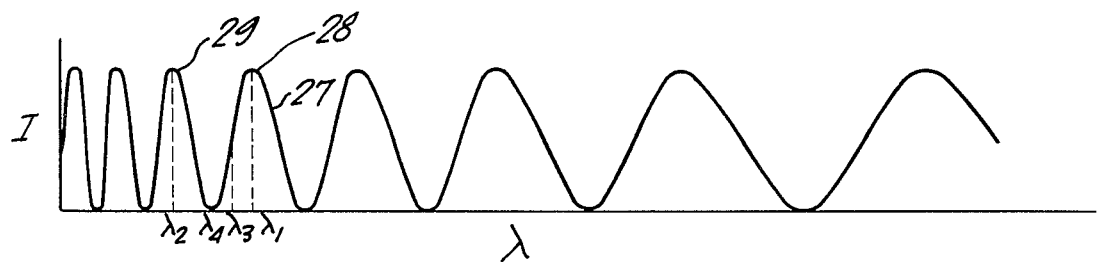
FIG. 3 is a waveform showing the intensity of light passing through a liquid crystal cell as a function of wavelength.

FIG. 3 shows a similar curve 27 of the intensity of light passing through liquid crystal cell 10 as a function of wavelength. Each of the maxima shown in FIG. 3 corresponds to a different order M. For example, at a wavelength $\lambda_1$, the maximum shown at 28 might correspond to M=14. At wavelength $\lambda_2$, where there is a maximum at 29, M=15.

Figure 4:
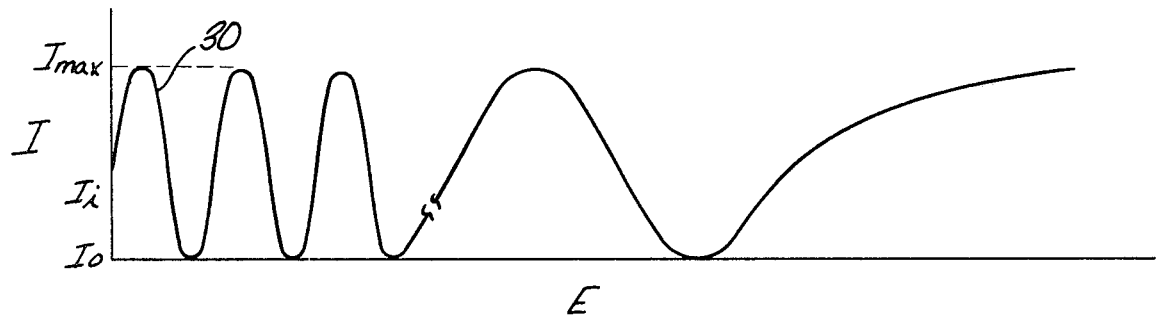
FIG. 4 is a waveform showing intensity as a function of voltage for a liquid crystal cell.

In any event, the application of a voltage to cell 10 changes $\Delta n$ and the retardation of cell 10. For a given wavelength of light passing through cell 10, which light is polarized, with cell 10 being oriented with its optical axis at a 45° angle to the plane of polarization, the intensity of light passing through cell 10 would have the appearance shown in FIG. 4, curve 30. That is, as the retardation changes, as explained previously with regard to FIGS. 2(a)-2(c), the intensity I will alternate through maximum and minimum intensity values $I_{max}$ and $I_o$, respectively, until M approaches the zero order, which it does asymptatically. It can be seen that the light intensity I undergoes a number of oscillations. If one initially knows the thickness d of cell 10 and $\Delta n$, it is possible to determine $\lambda$ from this waveform.

Specifically, $\lambda$ can be determined from the waveform of FIG. 3 which identifies the particular intensity versus wavelength characteristics of cell 10 with no voltage applied thereto. That is, if the intensity goes through 14+ oscillations as the retardation of cell 10 is varied from its maximum to its minimum value, then $\lambda$ would have some value $\lambda_3$ between $\lambda_1$ and $\lambda_2$. The exact value of $\lambda_3$ will be determined by looking at the initial level of the intensity $I_i$, before voltage is applied to cell 10 and the initial direction of change of curve 30.

More specifically, if $\lambda_3=\lambda_1$ or $\lambda_2$, $I_i$ will have the value $I_{max}$. If $\lambda_3=\lambda_4$, where the intensity versus wavelength characteristics of cell 10 are a minimum, then $I_i$ will have the value $I_o$. Since $\lambda_3$ has some value between $\lambda_4$ and $\lambda_1$, the value of $I_i$ will be some value between $I_o$ and $I_{max}$ and the initial slope will be positive. By extrapolating the value of $I_i$ between $I_o$ and $I_{max}$, $\lambda_3$ can be accurately determined.

Figure 5:
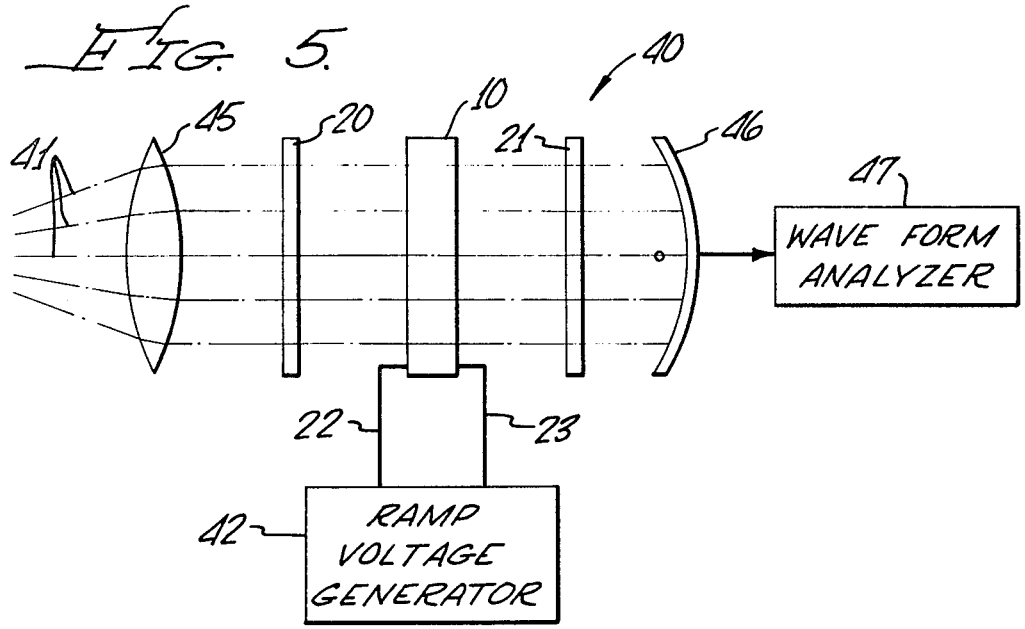
FIG. 5 is a diagrammatic view of apparatus constructed in accordance with the teachings of the present invention for determining the wavelength of a light beam.

Referring now to FIG. 5, there is shown apparatus, generally designated 40, for determining the wavelength of a light beam 41. Apparatus 40 includes liquid crystal cell 10 including leads 22 and 23 coupled to a ramp voltage generator 42. Cell 10 is positioned between polarizers 20 and 21, the optical axes of which may be either crossed or parallel. In any event, the optic axis of cell 10 is positioned at a 45° angle to the planer of polarization of polarizers 20 and 21.

Apparatus 40 includes means, such as a lens 45, for collimating and directing light beam 41 through polarizers 20 and 21 and cell 10. The light emerging from cell 10 is detected by detector means 46, the output of which is conducted to a waveform analyzer 47 for monitoring the intensity of the light detected by detector means 46 as generator 42 varies the retardation of cell 10 between its maximum and minimum values.

In theory, it is a relatively simple matter to count oscillations of the signal output from detector means 46 as a voltage is either applied to or removed from cell 10. In practice, it is best to measure the oscillations accompanying an increase in field rather than accompanying a decrease in field and the field should be ramped in about 0.1 seconds. The desired information is then gathered within 0.1 second.

Two methods of increasing resolution may be employed. The detected signal may be differentiated, doubling resolution with each differentiation. Noise limitations set a limit on the number of differentiations. A second method involves measurement of the light intensity at zero field, as discussed previously. An absolute measurement is not required. It will suffice to know that the light level is a fraction of the nearest retardation maximum. Fractional orders can be estimated using equation (2).

The above analysis assumes that a beam of monochromatic light is being interrogated. If the beam is broad banded, the amplitude I of the intensity oscillations decreases with increasing order. However, information of the wavelength of the intensity maximum exists in the retardation required when $M=\lambda/2$. Thus, information on both the bandcenter and bandwidth exists in the ramp signal and no transformations are required to extract the information. In other words, the output of detector means 46 will still crudely distinguish between different orders.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A method of determining the wavelength of a light beam comprising the steps of:
    directing the light beam through a liquid crystal cell, said liquid crystal cell including a liquid crystal material and a pair of electrodes, said cell functioning as a variable retarder as the voltage between said electrodes is varied;
    applying a varying voltage to said electrodes to vary the retardation of said cell between its maximum and minimum values;
    detecting the light from said beam passing through said cell;
    monitoring the intensity of said detected light, said intensity alternately passing through maximum and minimum values as said varying voltage is applied to said electrodes; and
    determining the number of times said intensity alternates between said maximum and minimum values as said retardation of said cell is varied between its maximum and minimum values.

2. A method according to claim 1, wherein said voltage is an increasing ramp-like voltage.

3. A method according to claim 1, wherein said step of determining the number of times said intensity alternates comprises the step of:
    counting the number of times said intensity passes through a maximum value.

4. A method according to claim 1, further comprising the step of:

determining the intensity of said detected light when the retardation of said cell is at its maximum value.

5. A method according to claim 1, 2, 3, or 4, wherein said liquid crystal material is a zero-twist, nematic-phase material.

6. A method according to claim 5, further comprising the step of:

positioning a pair of crossed or parallel polarizers in the path of said light beam, said cell being positioned between said polarizers with the optical axis of said cell at a 45° angle to the optical axes of said polarizers.

7. Apparatus for determining the wavelength of a light beam comprising:

a liquid crystal cell, said liquid crystal cell including a liquid crystal material and a pair of electrodes, said cell functioning as a variable retarder as the voltage between said electrodes is varied;

a pair of crossed or parallel polarizers, said cell being positioned between said polarizers with the optic axis of said cell at a 45° angle to the planes of polarization of said polarizers;

means for directing said light beam through said polarizers and said cell;

means for detecting the light from said beam passing through said cell;

means for applying a varying voltage to said electrodes of said cell to vary the retardation thereof between maximum and minimum values, wherein said intensity of said detected light alternately passes through maximum and minimum values as the retardation of said cell is varied between its maximum and minimum values; and means responsive to said detecting means for determining the number of times the intensity of said detected light alternates between said maximum and minimum values.

8. Apparatus according to claim 7, wherein said analyzing means further determines the intensity of said detected light when the retardation of said cell is at its maximum value.

9. Apparatus according to claim 7 or 8, wherein said voltage is a ramp-like voltage.

10. Apparatus according to claim 7 or 8, wherein said liquid crystal material is a zero-twist, nematic-phase material.

* * * * *